US009318895B2

(12) United States Patent
Nagatsuka

(10) Patent No.: US 9,318,895 B2
(45) Date of Patent: Apr. 19, 2016

(54) LOAD CONTROL SYSTEM AND LOAD DRIVING SYSTEM

(75) Inventor: Masaki Nagatsuka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/236,561

(22) PCT Filed: Jul. 31, 2012

(86) PCT No.: PCT/JP2012/069413
§ 371 (c)(1),
(2), (4) Date: Jan. 31, 2014

(87) PCT Pub. No.: WO2013/018786
PCT Pub. Date: Feb. 7, 2013

(65) Prior Publication Data
US 2014/0152096 A1    Jun. 5, 2014

(30) Foreign Application Priority Data

Aug. 1, 2011 (JP) ................................. 2011-168493

(51) Int. Cl.
*H02B 3/00* (2006.01)
*H02P 31/00* (2006.01)
(Continued)

(52) U.S. Cl.
CPC ............ *H02J 4/00* (2013.01); *G05B 19/4141* (2013.01); *H02B 3/00* (2013.01); *H02P 31/00* (2013.01); *G05B 2219/33219* (2013.01); *G05B 2219/39251* (2013.01); *G05B 2219/39252* (2013.01); *Y10T 307/305* (2015.04)

(58) Field of Classification Search
CPC .................................. H02P 3/00; H02P 31/00

USPC ............................................. 307/155; 318/34
See application file for complete search history.

(56) References Cited

U.S. PATENT DOCUMENTS 4,825,133 A * 4/1989 Tanuma et al. ............... 318/113
5,268,898 A * 12/1993 Kazato ......................... 370/447
(Continued)

FOREIGN PATENT DOCUMENTS

CN        87106108 A      4/1988
CN         1498730 A      5/2004
(Continued)

OTHER PUBLICATIONS

International Search Report for PCT/JP2012/069413, Mailing Date of Oct. 23, 2012.
(Continued)

*Primary Examiner* — Adi Amrany
(74) *Attorney, Agent, or Firm* — Westerman, Hattori, Daniels & Adrian, LLP

(57) ABSTRACT

A load control system has a plurality of drivers provided correspondingly to a plurality of load driving elements in order to control driving of the respective load driving elements for driving loads. Each of the plurality of drivers includes a control unit that controls the load driving element directly associated with a subject driver. The respective drivers are electrically connected to one another so that a mutual control communication state, in which the control unit of the subject driver can transmit to the control units of all or a portion of target drivers of other drivers excluding the subject driver a command signal for controlling the driving of a load driving element directly associated with the all or the portion of target drivers, is created in the load control system.

9 Claims, 8 Drawing Sheets

(51) Int. Cl.
*H02J 4/00* (2006.01)
*G05B 19/414* (2006.01)

(56) References Cited

U.S. PATENT DOCUMENTS

| | | | | |
|---|---|---|---|---|
| 5,473,225 | A | * 12/1995 | Miyazaki | 318/52 |
| 5,742,143 | A | 4/1998 | Katagiri | |
| 5,946,215 | A | * 8/1999 | Mito | 700/169 |
| 5,990,638 | A | * 11/1999 | Aoyama et al. | 318/85 |
| 6,188,190 | B1 | * 2/2001 | Arakawa | 318/560 |
| 6,442,444 | B2 | * 8/2002 | Matsubara et al. | 700/95 |
| 6,686,712 | B2 | * 2/2004 | Numaguchi et al. | 318/34 |
| 6,806,660 | B2 | * 10/2004 | Fujisaki et al. | 318/113 |
| 7,038,418 | B2 | * 5/2006 | Noda et al. | 318/569 |
| 7,119,505 | B2 | * 10/2006 | Komaki et al. | 318/113 |
| 7,135,826 | B2 | * 11/2006 | Ma et al. | 318/49 |
| 7,245,100 | B2 | * 7/2007 | Takahashi | 318/560 |
| 7,274,968 | B1 | * 9/2007 | Toyonaga | 700/169 |
| 8,569,987 | B2 | * 10/2013 | Winterhalter | 318/494 |
| 2003/0128007 | A1 | * 7/2003 | Fujisaki et al. | 318/560 |
| 2004/0160206 | A1 | 8/2004 | Komaki et al. | |
| 2007/0046238 | A1 | * 3/2007 | Xu | 318/571 |

FOREIGN PATENT DOCUMENTS

| | | |
|---|---|---|
| JP | 06-222816 A | 8/1994 |
| JP | 08-141957 A | 6/1996 |
| JP | 2000-020109 A | 1/2000 |
| JP | 2004-072870 A | 3/2004 |
| JP | 2009-025879 A | 2/2009 |
| TW | 571510 B | 1/2004 |

OTHER PUBLICATIONS

International Preliminary Report on Patentability (Form PCT/IB/373) of International Application No. PCT/JP2012/069413 dated Feb. 4, 2014, with Form PCT/ISA/237 (5 pages).
Chinese Office Action dated Oct. 30, 2014, issued in counterpart Chinese Patent Application No. 201280037776.X, w/English translation (9 pages).
German Office Action dated May 4, 2015, issued in corresponding German Application No. 11 2012 003 218.7, w/English translation (13 pages).
Office Action dated Dec. 15, 2015, issued in counterpart Taiwanese Patent Application No. 101127777, with English translation. (10 pages).

* cited by examiner

LOAD CONTROL SYSTEM AND LOAD DRIVING SYSTEM

TECHNICAL FIELD

The present invention relates to a load control system for controlling a load driving element for driving loads.

BACKGROUND ART

According to a general form of controlling an actuator for driving loads, a controller transmits a driving command to a driver corresponding to the actuator and the driver controls the driving of the actuator according to the command. However, in such an actuator driving form, controllers are disposed in respective actuators, and a control program for the actuator is set in each controller. Thus, the more the number of actuators to be driven, the larger the labor paid to establishment of the control system.

Thus, a technique for establishing a system for controlling the driving of a plurality of actuators has been developed. For example, in a system disclosed in Patent Document 1, intelligent motors (controller-integrated motors) are connected in series, and an uppermost intelligent motor is connected to a control unit that can connect to an external network. The system is configured such that the uppermost intelligent motor serves as a master motor to receive control information on the subject motor and the other motors from the control unit, and the control information can be transmitted to the other motors via series-connected signal lines. This system includes a "unit control mode" in which the control unit directly controls the master motor and indirectly controls the other motors with the aid of the master motor and a "self-control mode" in which the respective motors other than the master motor is operated by the master motor in a state where the control unit is separated from the master motor.

PRIOR ART DOCUMENT

Patent Document

Patent Document 1: Japanese Patent Application Publication No. 2004-72870

DISCLOSURE OF THE INVENTION

Problems to be Solved by the Invention

In a conventional system for controlling the driving of a plurality of actuators, controllers for controlling actuators and drivers of motors which are the actuators are integrated with the motors to form intelligent motors, and the intelligent motors are connected in series. In the system configured in this manner, an intelligent motor located on the uppermost stream within the series connection serves as a controller (that is, a master controller) for controlling the entire system. Thus, although controllers are not disposed in respective actuators, since the master controller is substantially disposed, the control program for the entire system set in the master controller may be complex and enormous. Due to this, from the perspective of control of actuators, the labor required for system establishment is still too large as in the conventional technique.

Moreover, when driving of a plurality of actuators is controlled, it may be requested to change the system configuration flexibly according to the driving purpose. However, in the conventional control system, it is necessary to change the program included in the master controller that controls the entire system. It can be said that the conventional system requires a lot of labor for the change and lacks flexibility.

The present invention has been made in view of the above problems, and an object of the present invention is to provide a load control system capable of facilitating establishment of the control system when controlling a plurality of load driving elements such as actuators for driving loads.

Means for Solving the Problems

In the present invention, in order to solve the problems, control units are provided in respective drivers for driving load driving elements, and a mutual control communication state is created in the mutual communication between the control units so that the driving of the load driving elements directly associated with the respective drivers can be controlled according to a command signal from other control units. With this system configuration, the driving control of the load driving elements can be distributed to the respective drivers. Thus, it is possible to simplify the system configuration.

Specifically, the present invention provides a load control system comprising a plurality of drivers provided correspondingly to a plurality of load driving elements in order to control driving of the respective load driving elements for driving loads, wherein each of the plurality of drivers includes a control unit that controls the load driving element directly associated with a subject driver.

Moreover, the respective drivers are electrically connected to one another so that a mutual control communication state, in which the control unit of the subject driver can transmit to the control units of all or a portion of target drivers of other drivers excluding the subject driver a command signal for controlling the driving of a load driving element directly associated with the all or the portion of target drivers, is created in the load control system.

In the load control system according to the present invention, a plurality of drivers is provided correspondingly to a plurality of load driving elements, and control units for controlling the load driving elements directly associated with the drivers are provided in the respective drivers. The load driving elements mentioned herein are control objects electrically connected for driving loads, and examples thereof include an actuator such as a motor that is controlled to apply force directly to a load and a sensor that acquires information necessary for the control. Moreover, "directly associated" means that one driver is subjected to allocation in the first place to allow the driver to control the driving of the load driving element while the load driving element can be controlled also based on a command from another driver and it does not mean that the driver is dedicatedly used for controlling the driving of the load driving element. That is, means that the control of the driving of the load driving element by the target driver is expressed by the term "directly", taking into account the abovementioned control of the driving of the load driving element by the target driver in the mutual control communication state.

Here, in the load control system, the mutual control communication state is created between the plurality of drivers. In this mutual control communication state, a driving control command signal for the load driving element directly associated with the subject driver is transmitted from the other target driver to the respective drivers, the subject driver having received the command signal controls the driving of the load driving element according to the content of the command. That is, although the direct driving control is performed by the subject driver, the command signal for the control content is output from the other target driver other than the subject driver. As a result, in the load control system, the driving control of the entire system is not concentrated to one site but is distributed to a driver group including a subject driver and a target driver. Thus, it is possible to suppress a program for controlling the driving of the entire system from becoming too big and to facilitate system establishment such as editing of programs.

Effects of the Invention

It is possible to provide a load control system which facilitates the establishment of the control system when controlling a plurality of load driving elements such as actuators for driving loads.

MODE FOR CARRYING OUT THE INVENTION

Hereinafter, a specific embodiment of the present invention will be described with reference to the drawings. It should be noted that dimensions, materials, shapes, relative arrangement, and the like of constituent components described in the present embodiment do not restrict the technical scope of the present invention unless otherwise particularly stated.

First Embodiment

Figure 1:
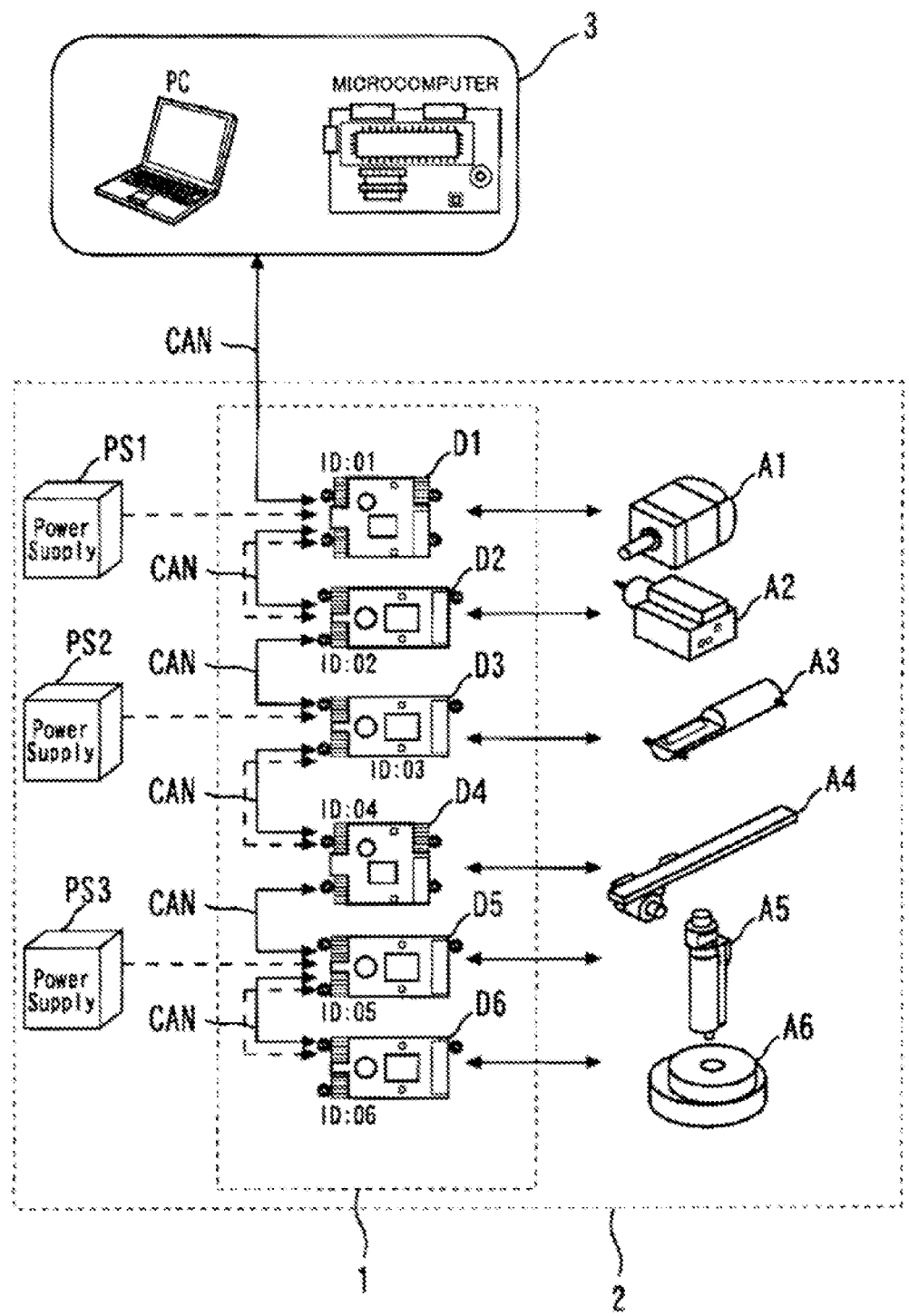
FIG. 1 is a diagram illustrating a schematic configuration of a load control system and a load driving system according to an embodiment of the present invention.

An embodiment of the load control system according to the present invention will be described based on the accompanying drawings of the present specification. The load control system is a system for controlling a plurality of actuators or sensors for driving loads. A load control system 1 according to the present embodiment is a system that includes drivers D1 to D6 for driving six actuators A1 to A6 as illustrated in FIG. 1. The respective actuators A1 to A6 can be appropriately selected in order to realize predetermined load driving desired by a user, and an example thereof includes a motor or the like that drives respective joints of a multi-joint robot. In the load control system 1 illustrated in FIG. 1, the drivers D1 to D6 for driving the actuators A1 to A6 are disposed so as to be directly associated with the respective actuators A1 to A6. A biaxial power supply unit PS1 supplies power to the actuators A1 and A2 according to a command from the drivers D1 and D2. A biaxial power supply unit PS2 supplies power to the actuators A3 and A4 according to a command from the drivers D3 and D4. A biaxial power supply unit PS3 supplies power to the actuators A5 and A6 according to a command from the drivers D5 and D6. In this manner, the load control system 1 including the drivers D1 to D6, the actuators A1 to A6, and the power supply units PS1 to PS3 form a load driving system 2 according to the present invention. In the embodiment illustrated in FIG. 1, although the power supply units PS1 to PS3 are provided as a power supply unit of the load driving system 2, the power supply unit may be provided for each actuator, and one power supply unit may supply power to all actuators.

In the load control system 1, a control unit for controlling the driving of the actuators A1 to A6 is integrated into each of the drivers D1 to D6 included therein. The control unit is formed as a dedicated processor or a program or the like executed by the processor. In the load control system 1, as illustrated in FIG. 1, the control units mounted on these drivers are daisy-chain connected in series and the control units can perform controller area network (CAN) communication. An ID for identifying each driver is set to each of the drivers D1 to D6, and the ID is stored in the control unit possessed by the driver. In the present embodiment, IDs (ID01 to ID06) are set to the drivers D1 to D6, respectively. In the embodiment illustrated in FIG. 1, the drivers D1 to D6 are daisy-chain connected in that order, the driver D1 is on the uppermost stream, and a terminator indicating the end of the connection is provided in the lowermost driver D6.

Moreover, an external script rewriting device 3 is connected to the load control system 1 so that CAN communication can be realized. The script rewriting device 3 is connected to a CAN communication line of the daisy-chain connection, and the connection enables a control script (program) for driving the actuators included in the plurality of daisy-chain connected drivers D1 to D6 to be rewritten. Thus, when it is not necessary to rewrite the script, it is not necessary to establish the CAN communication connection between the script rewriting device 3 and the load control system 1. The script rewriting device 3 is formed as a personal computer or a microcomputer that executes the script rewriting program.

Figure 2A:
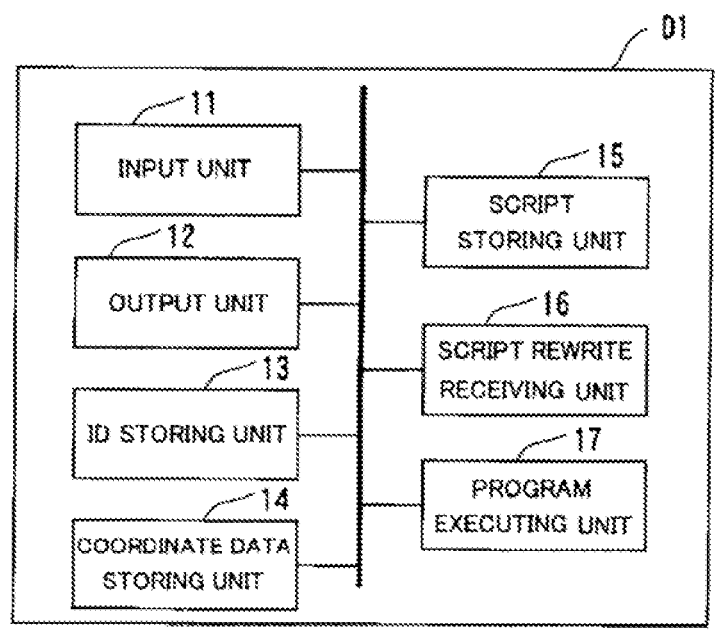
FIG. 2A is a functional block diagram illustrating the functions of a driver included in the load control system illustrated in FIG. 1.
Figure 2B:
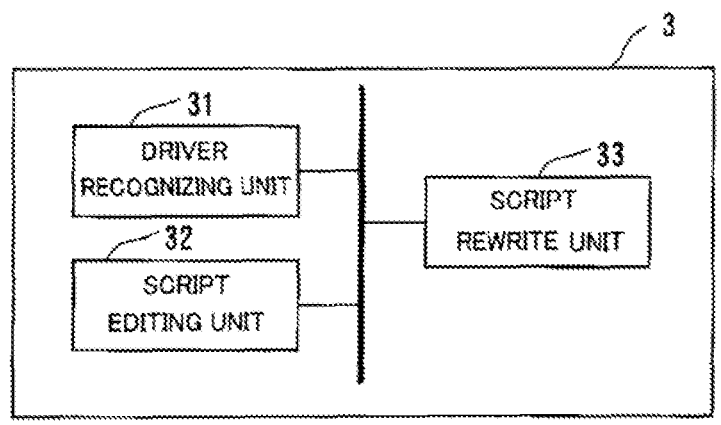
FIG. 2B is a functional block diagram illustrating the functions of a script rewriting device included in the load control system illustrated in FIG. 1.

FIG. 2A illustrates a functional block diagram illustrating the functions performed by the control unit of the driver D1 which is a representative driver of the drivers D1 to D6. The functions represented by the functional blocks are realized by the program executed by the control unit using hardware such as processors, input/output ports, memories, or the like installed on the driver. FIG. 2B illustrates the functional block diagrams of the control executed by the script rewriting device 3. The control contents performed by the functional blocks are realized by various methods such as processors included in the script rewriting device 3 and programs or the like executed by the processors.

In the control unit of the driver D1, an input unit 11, an output unit 12, an ID storing unit 13, a coordinate data storing unit 14, a script storing unit 15, a script rewrite receiving unit 16, and a program executing unit 17 are formed. The input unit 11 is a functional unit to which data required for controlling the driving of the actuator A1 directly associated with the driver D1 is input via an input port of the driver D1. In particular, the input unit 11 is a functional unit to which a command signal for the actuator A1 is input from the drivers (that is, the drivers D2 to D5) other than the driver D1, which will be described later. Contrary to the input unit 11, the output unit 12 is a functional unit that outputs a command signal for driving the respective actuators directly associated with the drivers (that is, the drivers D2 to D5) excluding the driver D1 to the control units included in the respective drivers via the output port of the driver D1. Thus, the command signal output from the output unit 12 included in the control unit of the driver D1 is input to the input unit 11 included in the control unit of the other destination driver. The ID storing unit 13 is a functional unit that stores identification IDs set to the respective drivers as described above. Specifically, the identification IDs (for example, ID01 in the case of the driver D1) is stored in a memory on the driver D1. The coordinate data storing unit 14 is a functional unit that stores coordinate data that belongs to a movable range of the actuator A1 in relation to the driving of the actuator A1. A command that directly designates a destination coordinate of the actuator A1 is prepared in the program in the script storing unit 15 described later, and the coordinate data stored in the coordinate data storing unit 14 is used as a parameter of the command. In the present embodiment, up to 256 items of coordinate data can be stored in the coordinate data storing unit 14.

Next, the script storing unit 15 is a functional unit that stores scripts including a program for controlling the driving of the actuator A1 directly associated with the driver D1 and the programs for controlling the driving of the actuators (that is, the actuators A2 to A5) directly associated with the drivers other than the subject driver in the memory in the driver D1. Although the details of the scripts will be described later, it should be noted in the present embodiment that the driver D1 is configured to issue a driving command to actuators directly associated with the other drivers other than the subject driver. The script rewrite receiving unit 16 is a functional unit that receives a rewrite command when the script rewriting device 3 outside the load control system 1 rewrites the scripts. Thus, as described later, the scripts edited by the script rewriting device 3 are received by the script rewrite receiving unit 16 together with the rewrite command, whereby the drive control program (script) stored in the script storing unit 15 is rewritten. The program executing unit 17 executes the drive control program (script) stored in the script storing unit 15 to actually control the driving of the actuators. The program is configured to designate a driving target actuator by the identification ID of the driver. Due to this, the actuators that are subjected to the driving control of the program executing unit 17 are all actuators A1 to A6 that are daisy-chain connected.

Although FIG. 2A illustrates the functional blocks of the driver D1, the other drivers D2 to D6 and a driver according to the present invention described later also have substantially the same functional blocks. Thus, in the load control system 1, a mutual control communication state in which a command signal for controlling the driving of an actuators directly associated with target drivers can be transmitted to all or a portion of target drivers of the other drivers other than the subject driver as well as the actuators directly associated with the subject driver via the input unit and the output unit included in the control units of the respective drivers is created. This mutual control communication state is maintained regardless of a mutual connection form (for example, a form in which all of the plurality of drivers is connected in series or a form in which a portion of the plurality of drivers is connected in parallel to one driver included in the plurality of drivers) of the plurality of drivers included in the load control system 1. Thus, the user can create the mutual control communication state to facilitate system establishment without paying special attention to the connection order of drivers and so on.

Next, the functional units formed in the script rewriting device 3 will be described with reference to FIG. 2B. A driver recognizing unit 31, a script editing unit 32, and a script rewrite unit 33 are formed in the script rewriting device 3. The driver recognizing unit 31 is a functional unit that recognizes a driver included in the load control system 1 in a state where the script rewriting device 3 is connected to the load control system 1 via CAN communication connection. The driver recognized by the driver recognizing unit 31 is the target of the script editing or rewriting of the script rewriting device 3. The script editing unit 32 is a functional unit that performs an editing process such as adding, changing, or deleting of the script stored in the control unit of the driver included in the load control system 1. Details of the script editing will be described later. The script rewrite unit 33 is a functional unit that rewrites scripts by reflecting the script editing performed by the script editing unit 32 on the scripts stored in the driver-side script storing unit. The script rewriting is performed via the CAN communication connection between the script rewriting device 3 and the load control system 1 and the daisy-chain connection between the drivers and the input/output ports of the respective drivers.

Figure 3:
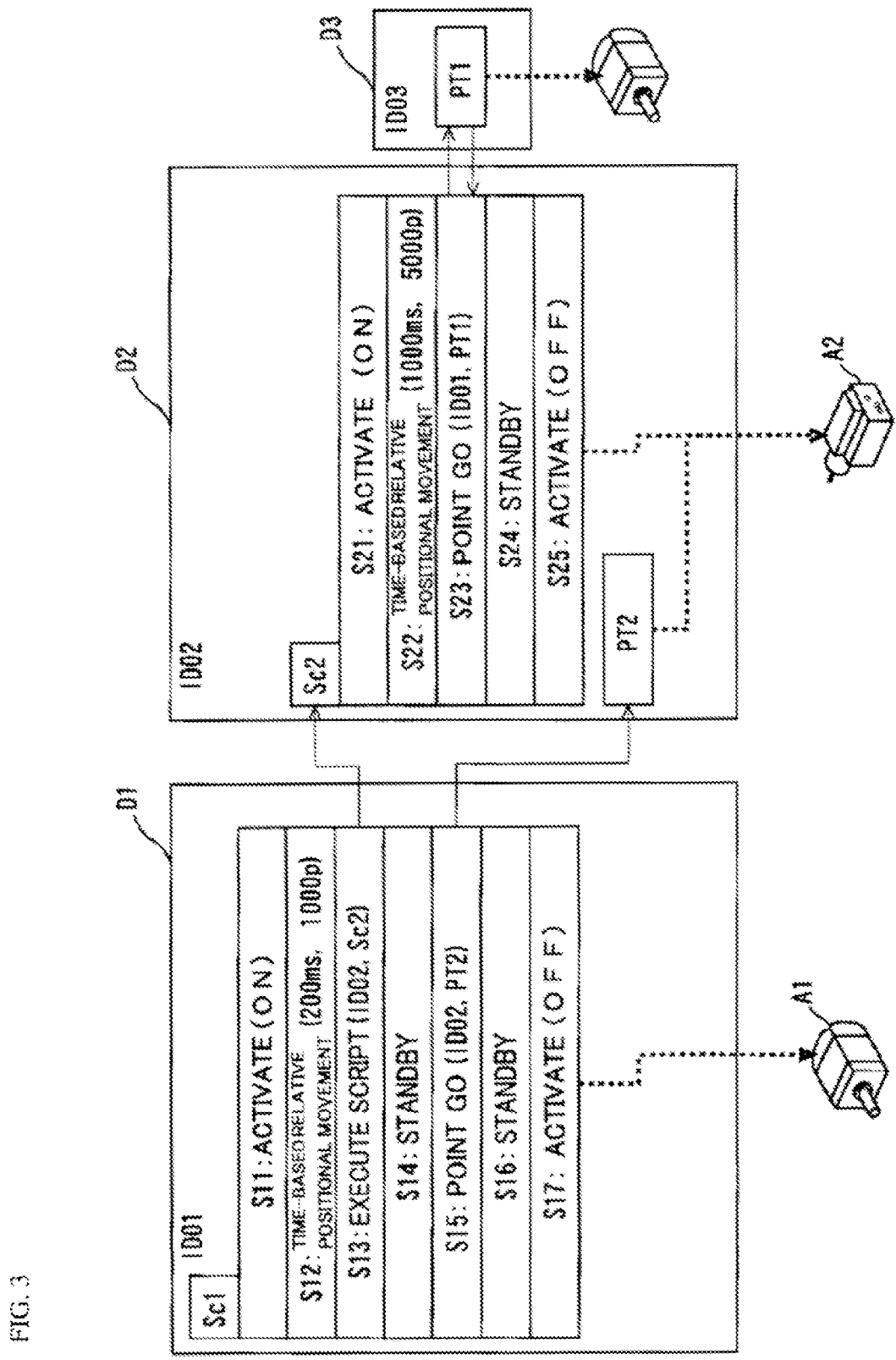
FIG. 3 is a diagram illustrating the flow of an actuator control operation performed by the load control system illustrated in FIG. 1.

Here, driving control of the actuator by the load control system 1 will be described with reference to FIG. 3. In order to simplify the description, FIG. 3 illustrates the driving control of the actuators A1 and A2. FIG. 3 illustrates the scripts stored in the control units of the drivers D1 and D2 and the point tables stored in the control units of the drivers D2 and D3. Although FIG. 3 does not illustrate the point table of the driver D1 and the script of the driver D3, the point table and the script are not illustrated for the sake of convenience of the description of the present embodiment, each driver may include the script and the point table as necessary. The script is a program group that describes a control program for driving an actuator in multiple lines. In the embodiment of the present invention, the control unit of one driver stores up to eight scripts and each script is configured to include up to 99 lines of control programs. The point table is a table composed of a movement position and a movement period required for the movement when an actuator is driven. In the embodiment of the present invention, the point table can include up to 256 combinations of movement positions and movement periods. The script is stored in the script storing unit 15, and the point table is stored in the coordinate data storing unit 14.

A script Sc1 stored in the control unit of the driver D1 illustrated in FIG. 3 is a script composed of seven lines S11 to S17 of control programs, and a script Sc2 stored in the control unit of the driver D2 is a script composed of five lines S21 to S25 of control programs. When the script Sc1 is executed, first, in step S11, an activation process is performed. This activation process is performed on the actuator A1 only directly associated with the processing driver D1. Due to this, in this activation process, the ID information of the subject axis of an actuator to be processed or a driver directly associated with the actuator is designated. With step S11, the actuator A1 is activated. Subsequently, in step S12, a time-based relative positional movement process is performed. The relative positional movement mentioned herein means relative movement performed based on a present position. This process is performed on the actuator A1 only directly associated with the driver D1 same as the activation process described above. Therefore, the time and moving distance (pulse count) regarding the relative positional movement are set as the parameter of the process. In the example illustrated in FIG. 3, in step S12, a process of moving the actuator A1 by a distance corresponding to 1000 p (pulses) for a period of 200 ms is performed.

Subsequently, in step S13, a script executing process is performed. This process is a process for executing the scripts of the control units of the other drivers as well as the subject driver (the driver D1 in the case of the present embodiment). Due to this, the ID of a driver in which the script executed is stored and the number of the script to be executed, stored in the driver designated by the ID are set as the parameter of the process. In the embodiment illustrated in FIG. 3, in step S13, the script Sc2 stored in the control unit of the driver D2 specified by ID02 is executed. Subsequently, in step S14, a standby process is performed. This standby process is a process of performing standby without proceeding to the next step until the pending process (in this case, the process of step S13) is completed. With step S13, the script Sc2 is executed, and the process subsequent to step S15 is not performed until the execution of the script Sc2 is completed.

The script Sc2 will be described briefly. As illustrated on the right side of FIG. 3, the script Sc2 is composed of five lines S21 to S25 of control programs. In step S21, a process of activating the actuator A2 directly associated with the driver D2 is performed. In step S22, similarly, a time-based relative positional movement process is performed on the actuator A2 (relative movement by a distance corresponding to 5000 p for a period of 1000 ms). Subsequently, in step S23, a process called "Point Go" is performed. The "Point Go" process involves moving process of an actuator associated with a driver having a designated ID according to a designated point table. In this process, since it is possible to designate the other drivers other than the subject driver by IDs, it is possible to drive actuators directly associated with the other driver other than the subject driver according to the point table. Since the point table is set for each driver, the user can easily understand the driving state of the actuator directly associated with the driver and to easily control the driving of the actuator. In step S23, ID03 which is the ID of the driver D1 and PT1 that designates the point table stored in the driver D3 are set as the parameter of the "Point Go" process. In this way, the driver D2 can control the driving of the actuator A1 directly associated with the driver D1 according to the designated point table PT1. A detailed form of the point table will be described later.

Subsequently, in step S24, a standby process is performed until the "Point Go" process of step S23 is completed. When the "Point Go" process is completed, the flow proceeds to step S25 to perform a process of deactivating the actuator A2. With the series of these processes, the driving control of the actuator specified by the script Sc2 is completed. As described above, since execution of the script Sc2 is activated in step S13 that is included in the script Sc1 of the driver D1, when the series of processes of the script Sc2 are completed, the process of step S15 is performed after it is checked in step S14 whether the operation is completed.

In step S15, the process called "Point Go" is performed. In this step, ID02 which is the ID of the driver D2 and PT2 that designates the point table stored in the driver D2 are set as the parameter of the "Point Go" process. In this way, the driver D1 can control the driving of the actuator A2 directly associated with the driver D2 according to the point table PT2.

Subsequently to step S15, a standby process is performed in step S16. Thus, the process subsequent to step S17 is not performed until the "Point Go" process in step S15 is completed. When a notification of the completion of the "Point Go" process of the actuator A2 is delivered from the driver D2 to the driver D1, it is determined in step S16 whether the operation has been completed, and the process of step S17 is performed. In step S17, a process of deactivating the actuator A1 is performed.

In the driving control of actuators by the load control system 1, the driver D1 can control the driving of the actuator A2 with the aid of the driver D2 connected by the daisy-chain connection as illustrated in the processes of steps S13 and S15 as well as the driving of the actuator A1 directly associated with the subject driver. On the other hand, the driver D2 can control the driving of the actuator A1 with the aid of the driver D1 connected by the daisy-chain connection as illustrated in the process of step S23 as well as the driving of the actuator A2 directly associated with the subject driver. That is, in the load control system 1, a mutual control communication state in which a command signal for allowing control units included in the other drivers other than the subject driver to control the driving of actuators can be transmitted to the other drivers is created. In this way, a system is established so that the respective drivers included in the load control system 1 can control the driving of all actuators. In other words, in the load control system 1, a master driver that controls the entire system is not present, and the control of the entire system is divided and allocated to the respective drivers. Due to this, it is possible to obviate the control of the entire system to be concentrated on one driver and to reduce the size of the control program to be allocated to each driver. Thus, it is possible to facilitate maintenance such as a change of a control program and to establish a flexible control program.

Although the drivers D1, D2, and D3 are illustrated in FIG. 3 in order to simplify the description, a mutual control communication state can be created in all drivers connected by the daisy-chain connection. For example, the driver D1 may control, via the drivers D4 and D6 or the like, the driving of the actuators A4 and A6 directly associated with the drivers D4 and D6 with the aid of the drivers D4 and D6. Conversely, the driver D4 may control the driving of the actuator A1 directly associated with the driver D1.

Figure 4:
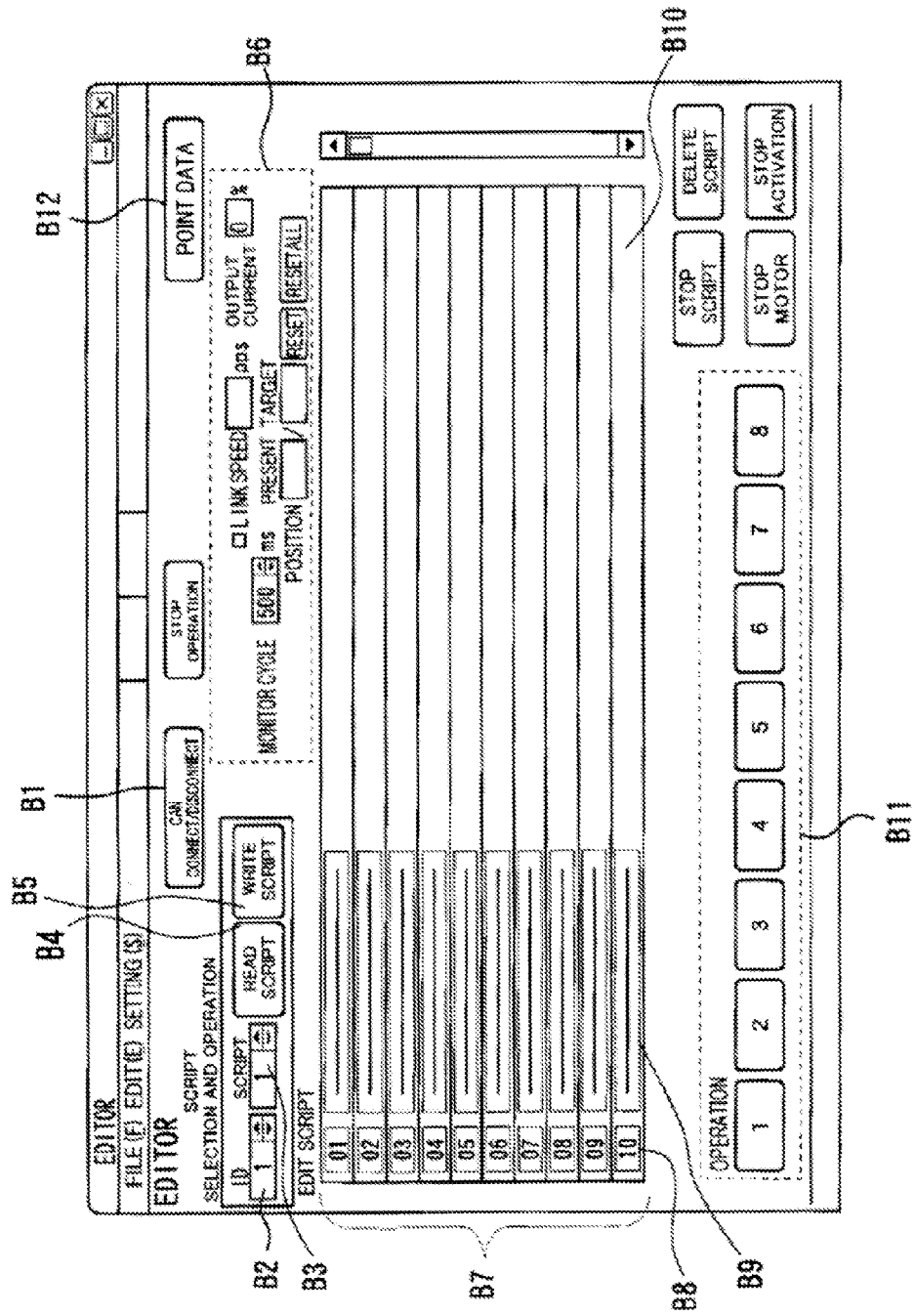
FIG. 4 is a diagram illustrating an editor screen serving as a script editor interface, displayed on a script rewriting device included in the load control system illustrated in FIG. 1.
Figure 5:
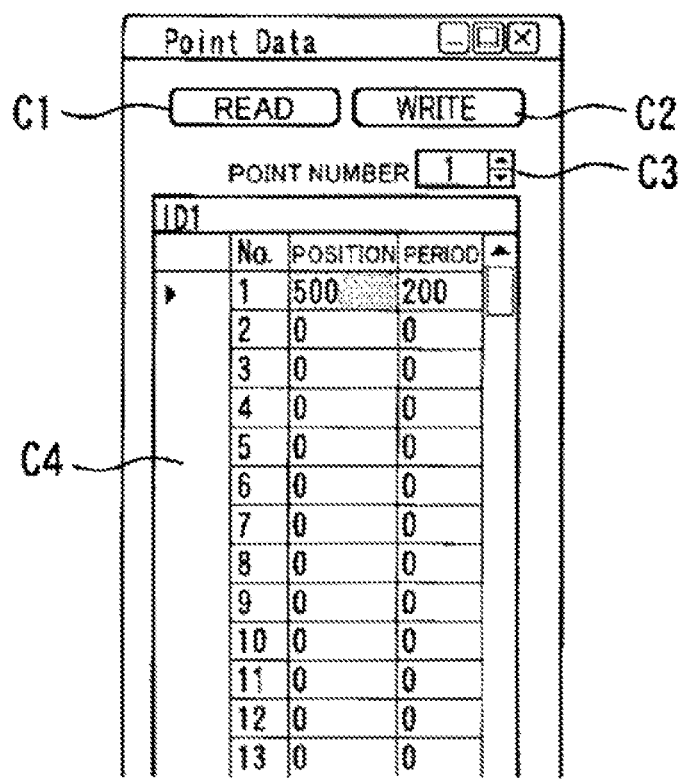
FIG. 5 is a diagram illustrating an editor screen serving as a point table editor interface, displayed on a script rewriting device included in the load control system illustrated in FIG. 1.

Next, the processes of the script rewriting device 3 editing and rewriting the script stored in the driver will be described with reference to FIGS. 4 and 5. FIG. 4 is an image of a script editor interface screen displayed on a display of the script rewriting device 3. FIG. 5 is an image of an interface screen for editing a point table illustrated in FIG. 3. When a program in the script rewriting device 3 is executed in a state where the script rewriting device 3 is physically connected to the load control system 1 by "daisy-chain" as illustrated in FIG. 1, an editor screen illustrated in FIG. 4 is displayed. When a user presses a "CAN Connect/Disconnect" button B1, the driver recognizing unit 31 recognizes the drivers connected by the script rewriting device 3. As a result, the script rewriting device 3 is electrically connected to the load control system 1. On the other hand, when the button B1 is pressed in a state where the electrical connection state is maintained, the connection state is removed so that a state where the script rewriting device 3 cannot perform electrical processing on the load control system 1 is created.

Here, the processes of the script rewriting device 3 editing and rewriting the script will be described assuming that the electrical connection state is maintained. Here, a region B2 is a region for selecting an ID assigned to the driver included in the load control system 1. Thus, in the present embodiment, ID01 to ID06 can be set. Moreover, a region B3 is a region for selecting a script stored in the driver selected in the region B2. In the present embodiment, since each driver stores up to eight scripts as described above, scripts of the numbers 1 to 8 can be selected in the region B3. When a button B4 is pressed, script information corresponding to the driver and the script selected in the regions B2 and B3 is read from the script storing unit 15 included in the control unit of the driver. The read script information is displayed in a script display region B7. The script display region B7 is a region for displaying the script information so as to be easily understood by the user and allowing the content thereof to be edited. Thus, the script information editing process in the script display region B7 corresponds to the editing process of the script editing unit 32. Moreover, it is necessary to press a button B5 in order to write the script edited in the script display region B7 to the script storing unit 15 included in the control unit of a predetermined driver, which will be described later. The script writing process realized by pressing the button B5 corresponds to the rewriting process of the script rewrite unit 33 because the script presently stored in the script storing unit 15 is rewritten by the script rewrite receiving unit 16 of a driver (the driver selected in the region B2) in which writing is designated.

Moreover, a monitor region for monitoring an operation state such as an operation speed or an output current of an actuator directly associated with the driver selected in the region B2 is provided above the script display region B7. This monitor region is useful for monitoring whether the actuator is driven as intended according to the edited script. The operation of the script can be checked by pressing a script operation button provided in a region B11. The numbers displayed in the script operation button correspond to the numbers 1 to 8 of the scripts stored in the respective drivers.

Next, the script display region B7 will be described in detail. The script display region B7 displays information on the selected script in a line number region B8, an operation type region B9, and an operation data region B10. On the selected line, the user can select the type of operation to be executed by the actuator in the operation type region B9 and input data (parameter) required for the selected operation type in the operation data region B10. Examples of the operation type selectable in the operation type region B9 include the activation process, the time-based relative positional movement process, the script executing process, the standby process, and the "Point Go" process illustrated in FIG. 3 as well as various processes useful for driving actuators. Moreover, although the data input in the operation data region B10 is different depending on the operation type selected in the operation type region B9, for example, when the script executing process is selected, the ID of the driver having a script to be executed and a script number for specifying the script stored in the driver are input as the parameter required for the process. Moreover, when the activation process or the standby process is selected in the operation type region B9, it is not necessary to input data in the operation data region B10. In this manner, the user can input the driving state required for the actuator in the script display region B7 according to the processing order through the editor and rewriting screen illustrated in FIG. 4 and to easily write the script information as the script of the driver designated by the button B5.

Here, a "Point Data" button B12 is provided on the top right corner of the screen illustrated in FIG. 4. When the button B12 is pressed, information on the point table used in the "Point Go" process, stored in the driver selected in the region B2 is displayed (see FIG. 5). FIG. 5 illustrates an example of an interface screen for editing the point table stored in the ID01 driver D1, and this screen includes a read button C1, a write button C2, a point select region C3, and a table display region C4. When the read button C1 is pressed, the information (a movement position and a period required for the movement) on the point table stored in the designated driver is displayed again in the table display region C4. When the write button C2 is pressed, the information on the point table displayed and edited in the table display region C4 is rewritten to the coordinate data storing unit 14 included in the control unit of the designated driver. A point to be focused is selected in the table display region C4 with the aid of the point select region C3, and the selected point can be edited in the table display region C4. In the present embodiment, since the largest number of points of the point table is 256, points 1 to 256 can be selected in the point select button. In this manner, the point table stored in the driver can be edited and rewritten by the script rewriting device 3 similarly to the script.

As described above, in the load control system 1 according to the present embodiment, the scripts and the point tables are stored in the respective drivers so that actuators of all axes can be controlled. Since the editor and rewriting interface illustrated in FIGS. 4 and 5 is prepared in the script rewriting device 3 in relation to the driver having such a configuration, the user can easily edit and rewrite the script and the point table.

Second Embodiment

Figure 6:
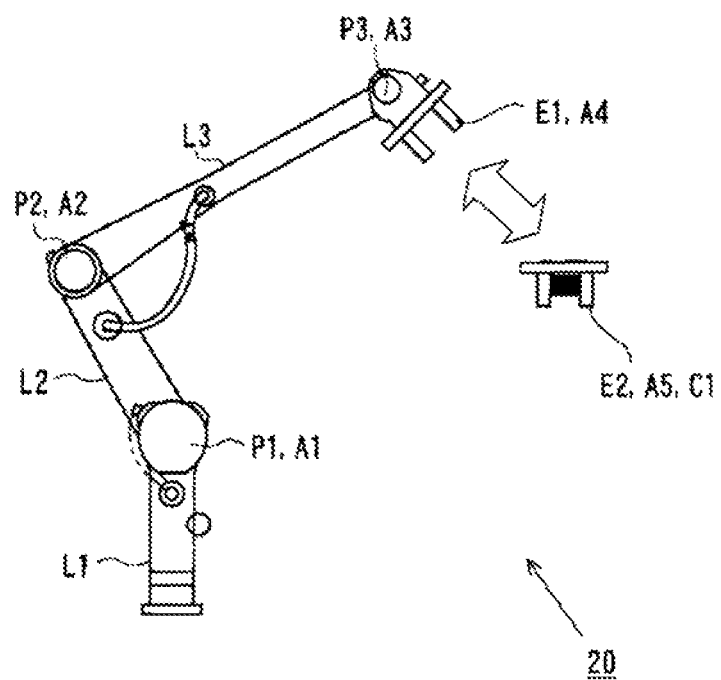
FIG. 6 is a diagram illustrating a schematic configuration of a robot to which the load control system according to an embodiment of the present invention is applied.

Next, a second embodiment of the present invention will be described with reference to FIGS. 6 and 7. In the present embodiment, in the load control system according to the present invention, a control unit included in each of a plurality of drivers included in the system is formed such that, when one of a plurality of drivers included in the system is replaced with another driver, and the other driver excluding the replaced driver among the plurality of drivers outputs the same command signal as the command signal for the replaced driver to the other driver which is a replacement driver, the load driving element directly associated with the other driver which is the replacement driver executes the same predetermined operations as the load driving element directly associated with the replaced driver.

Specifically, the present embodiment is a case where the first embodiment is applied to a robot having an end effector. FIG. 6 is a diagram illustrating a schematic configuration of a robot 20 according to the present embodiment. The robot 20 includes arm members L1, L2, and L3 connected in that order by joint portions P1 and P2 and an end effector E1 attached to a distal end of the arm member L3 by a joint portion P3. Moreover, actuators A1, A2, and A3 for driving the respective joint portions are attached to the joint portions P1, P2, and P3, and an actuator A4 for opening and closing the end effector E1 is attached to the end effector E1. A specific structure for allowing the respective actuators to transmitting driving force to the arm members and the end effector is known in the related art, and description thereof will not be provided. In the robot 20 configured in this manner, the load control system according to the present invention can be applied to control the actuators A1 to A4, and the connection state of the drivers directly associated with the respective actuators when the load control system is applied is illustrated in FIG. 7.

Figure 7:
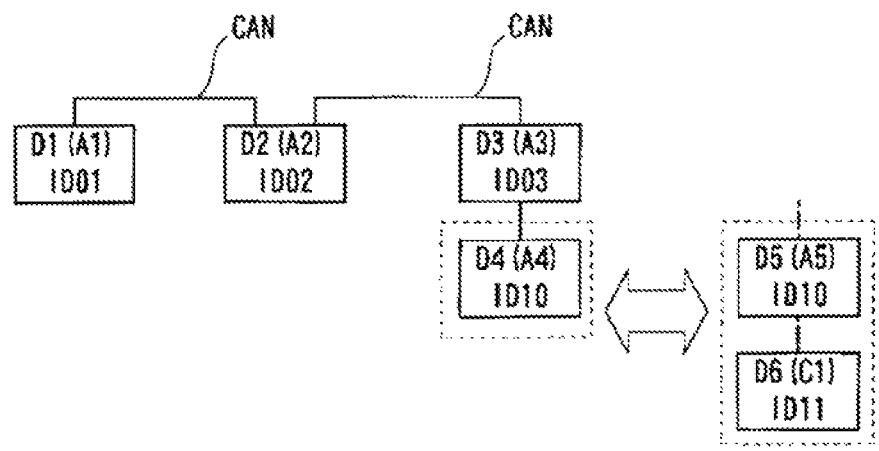
FIG. 7 is a diagram illustrating a connection state between drivers, in the robot illustrated in FIG. 6.

FIG. 7 illustrates a state where the drivers D1 to D4 directly associated with the actuators A1 to A4 are daisy-chain connected so that CAN communication can be realized. Since the load control system according to the present invention is applied to the robot 20, it is not necessary to provide a so-called central control device that serves as a master controller for controlling the entire robot 20 as shown in the first embodiment, and scripts (programs) for controlling the robot 20 can be distributed to the respective drivers D1 to D4. For example, a script for controlling the actuator A1 is disposed in the driver D1, and a script for controlling the actuator A4 opening and closing of the end effector E1 is disposed in the driver D4. Moreover, a script for executing the script for controlling the opening and closing of the end effector E1 included in the driver D4 using the script executing process described with reference to FIG. 3 is disposed in the driver D1. Further, a command signal for driving the end effector E1 and the other actuators may be transmitted from the other drivers D2 and D3. With this configuration, the distributed control described in the first embodiment can be realized.

Here, IDs are assigned to the drivers of the present embodiment in such a way that ID01 to ID03 are assigned to the drivers D1 to D3 similarly to the previous embodiment and ID10 is assigned to the driver D4. In the robot 20, the end effector attached to the joint portion P3 can be replaced according to the purpose. That is, in the embodiment illustrated in FIG. 6, the end effector E1 can be replaced with an end effector E2. The end effector E2 has the same opening and closing structure for gripping as the end effector E1 from the perspective of gripping an object and further has a camera C1 mounted thereon in order to allow more accurate gripping control. A driver of the camera C1 directly associated with the camera C1 is daisy-chain connected to the driver D5 directly associated with the actuator A5 for opening and closing the opening and closing structure as a driver D6 so that CAN communication can be realized. Moreover, the ID assigned to the driver D5 is ID10 which is the same ID as that assigned to the driver D4 and the ID assigned to the driver D6 is ID11 which is the same ID as that assigned to the driver D6. Further, a script for controlling the actuator A5 opening and closing the end effector E2 is disposed in the driver D5 similarly to the driver D4. Furthermore, a script for accurately controlling the positioning of the end effector E2 according to the input from the camera C1 is disposed in the driver D6. As a result, for example, rough positioning of the end effector E2 is executed based on the command signals from the drivers D1 to D3, and after that, accurate positioning of the end effector E2 is executed based on a command signal from the driver D6.

In this manner, the end effector used can be switched between the end effectors E1 and E2 according to the usage of the end effector. When the end effector E1 is replaced with the end effector E2, and the driver D4 connected to the driver D3 is changed to the drivers D5 and D6, the same ID may be assigned to the drivers D4 and D5. Thus, it is possible to operate the robot 20 without greatly changing the control script for allowing the end effector E2 to grip an object. That is, since the script for instructing the opening and closing of the end effector E2 is disposed in the driver D1, it is possible to execute a script for controlling the opening and closing disposed in the driver D5 using the script. Moreover, since the script for accurate positioning of the end effector E2 is disposed in the driver D6, accurate positioning can be controlled by performing the replacement. In addition, it is not necessary to substantially edit the scripts on the drivers D1 to D3.

By applying the load control system according to the present invention to the robot 20 in this manner, even when the end effector is replaced, it is not necessary to edit the control script for controlling the gripping of an object too much. Thus, the user's convenience is improved. This is because the control script for gripping control is appropriately distributed to the respective drivers.

Other Embodiments

Although the above embodiments illustrate an example in which the load control system according to the present invention is applied to a robot, the load control system can be also applied to housing as other embodiments. Examples of equipments of a house include a shutter, a blind, a window, and a locking device. By opening, closing, locking, and unlocking these equipments using actuators such as motors, the safety and convenience of the house can be improved. In such a case, by connecting the drivers of the respective actuators by a daisy-chain and distributing the control script to the control units of the respective drivers, the same advantages as the advantages of the first and second embodiments can be obtained. That is, so-called intelligent housing (automated control using electrically powered equipment) can be realized with easy maintenance.

REFERENCE NUMERALS

1: Load control system
2: Load driving system
3: Script rewriting device
A1 to A6: Actuator
D1 to D6: Driver
PS1 to PS3: Power supply unit
20: Robot

The invention claimed is:

1. A load control system comprising:
a plurality of drivers provided correspondingly to a plurality of actuators in order to control driving of the respective actuators for driving loads, each of the plurality of drivers including a control unit that controls the actuator directly associated with a subject driver and generates a command signal for controlling the driving of an actuator directly associated with all or a portion of other drivers in the plurality of drivers excluding the subject driver, the respective drivers being electrically connected to one another; and
a mutual control communication state, in which the control unit of each of the plurality of drivers transmits to the control units of the all or the portion of other drivers in the plurality of drivers excluding the subject driver the command signal for controlling the driving of the actuator directly associated with the all or the portion of other drivers,
wherein the control unit of each of the plurality of drivers is formed such that, when one of the plurality of drivers is replaced with a replacement driver, and another one of the plurality of drivers excluding the replaced driver generates to the replacement driver the same command signal as the command signal for the replaced driver, the actuator directly associated with the replacement driver executes the same predetermined operation as the actuator directly associated with the replaced driver.

2. The load control system according to claim 1, wherein the mutual control communication state is maintained in the load control system regardless of a form of mutual connection among the plurality of drivers.

3. The load control system according to claim 2, wherein in the load control system, all of the respective drivers are connected in series or a portion of the plurality of drivers is connected in parallel to one driver included in the plurality of drivers.

4. The load control system according to claim 1, wherein in the load control system, all of the respective drivers are connected in series or a portion of the plurality of drivers is connected in parallel to one driver included in the plurality of drivers.

5. The load control system according to claim 1, wherein the command signal for the actuator directly associated with the all or the portion of other drivers in the plurality of drivers originates from a script that is executed by the control unit of the subject driver.

6. The load control system according to claim 5, wherein the script uses a point table including an ID for each of the plurality of drivers, and the script includes a command that controls the actuator directly associated with one or all of the plurality of drivers other than the subject driver using the ID from the point table for said one or all of the plurality of drivers other than the subject driver.

7. The load control system according to claim 1, wherein the control unit of each of the plurality of drivers executes a script to generate the command signal for controlling the driving of the actuator directly associated with the all or the portion of the other drivers, and wherein the control unit of the another one of the plurality of drivers executes the same script as before said one of the plurality of drivers is replaced with the replacement driver to drive the actuator directly associated with the replacement driver after said one of the plurality of drivers is replaced with the replacement driver.

8. The load control system according to claim 7, wherein the script uses a point table including an ID for each of the plurality of drivers, and the script includes a command that controls the actuator directly associated with one or all of the plurality of drivers other than the subject driver using the ID from the point table for said one or all of the plurality of drivers other than the subject driver.

9. A load driving system comprising:
the load control system according to claim 1;
the plurality of actuators corresponding to the plurality of drivers included in the load control system; and
a power supply unit that supplies power to the plurality of actuators.

* * * * *